United States Patent
Goldovsky et al.

(10) Patent No.: US 6,584,484 B1
(45) Date of Patent: Jun. 24, 2003

(54) INCORPORATION OF SPLIT-ADDER LOGIC WITHIN A CARRY-SKIP ADDER WITHOUT ADDITIONAL PROPAGATION DELAY

(75) Inventors: Alexander Goldovsky, Philadelphia, PA (US); Bimal Patel, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/569,022

(22) Filed: May 11, 2000

(51) Int. Cl.$^7$ ................................................. G06F 7/50
(52) U.S. Cl. ........................................ 708/706; 708/710
(58) Field of Search ................................. 708/706, 710, 708/711, 712

(56) References Cited

U.S. PATENT DOCUMENTS

| | | | | |
|---|---|---|---|---|
| 3,728,532 A | * | 4/1973 | Pryor | 708/711 |
| 4,827,444 A | * | 5/1989 | Akiyama et al. | 708/711 |
| 5,337,269 A | | 8/1994 | McMahan et al. | 708/711 |
| 5,581,497 A | | 12/1996 | Kumar | 768/711 |
| 5,838,602 A | * | 11/1998 | Feiller et al. | 708/714 |
| 6,199,091 B1 | * | 3/2001 | Kobayashi et al. | 708/706 |
| 6,301,600 B1 | * | 10/2001 | Petro et al. | 708/670 |
| 2002/0091744 A1 | * | 7/2002 | Kantabutra et al. | 708/712 |

* cited by examiner

Primary Examiner—David H. Malzhahn
(74) Attorney, Agent, or Firm—Ryan, Mason & Lewis, LLP

(57) ABSTRACT

An n-bit carry-skip adder includes a number of carry-skip stages and a logic circuit associated with one or more of the stages. The logic circuit includes split-adder logic and carry-skip logic configured such that a split control signal associated with the split-adder logic is applied to at least one gate of the carry-skip logic, so as to reduce a carry propagation delay of the adder. In an illustrative embodiment, the logic circuit is associated with an (n/2+1)th carry-skip stage of the adder, and the adder is configured to perform two parallel n/2-bit additions when the split control signal is at a first logic level, and to perform a single n-bit addition when the split control signal is at a second logic level. Advantageously, the invention allows the split-adder logic to be incorporated in a manner which minimizes the carry propagation delay without increasing the required circuit area.

16 Claims, 4 Drawing Sheets

US 6,584,484 B1

INCORPORATION OF SPLIT-ADDER LOGIC WITHIN A CARRY-SKIP ADDER WITHOUT ADDITIONAL PROPAGATION DELAY

FIELD OF THE INVENTION

The present invention relates generally to electronic circuits and more particularly to adders for use in semiconductor integrated circuits and other electronic devices.

BACKGROUND OF THE INVENTION

Adders are fundamental components of microprocessors, memory circuits, digital signal processors, communications hardware and numerous other electronic devices. The ever-increasing demand for higher speed and bandwidth in such devices requires that adders operate faster and support a longer word length.

In a conventional ripple-carry adder, a carry generated by an earlier adder stage is supplied to the next adder stage before the next stage can generate its carry. The carry propagation delay is therefore proportional to the number of stages in the adder.

A carry-skip adder provides reduced propagation delay relative to a ripple-carry adder by evaluating at a given adder stage each carry from the previous adder stages to determine if any stages can be skipped without affecting the addition result. The carry-skip adder is based on the principle that the carry propagation process can skip any adder stage j for which $a_j \neq b_j$, where $a_j$ and $b_j$ denote the two binary numbers to be added in stage j. In other words, any adder stage j for which a propagate signal $p_j$ satisfies the condition $p_j = a_j \oplus b_j = 1$ can be skipped. Several stages can be skipped if all such stages satisfy $a_j \neq b_j$.

FIG. 1 shows an example of a conventional n-stage carry-skip adder 100. The n-stage adder 100 includes n k-bit ripple-carry adders 102-1, . . . 102-j, . . . 102-n, where $0 < j \leq n$, and a set of carry-skip logic circuitry 104. The number k is also referred to as the block length of the carry-skip adder, and each of the ripple-carry adders are also referred to as carry-skip stages or simply stages. Each of the k-bit ripple-carry adders 102-i, i=1, 2, . . . n, receives corresponding partial inputs $a_i$, $b_i$, and generates a corresponding partial sum $s_i$. In addition, each of the ripple-carry adders 102-i other than the first adder 102-1 receives a corresponding primary carry input signal $C_{INi}$ generated by the carry-skip logic circuitry 104. The first stage 102-1 receives a first carry input $C_1$. All of the ripple-carry adders 102-i other than the last adder 102-n supply a corresponding carry output signal $C_{OUTi}$ to the carry-skip logic circuitry 104.

Each of the k-bit adders 102-i also generates a block-carry-propagate signal. For example, for the stage j adder 102-j the block-carry propagate signal is defined as:

$$P_j^{j+k-1} = p_j p_{j+1} \cdots p_{j+k-1}, \text{ where } k \leq j.$$

The carry out $C_{OUTj}$ of the k-bit adder 102-j may be expressed as $$c_{j+k} = P_j^{j+k-1} \cdot c_j + G_j^{j+k-1}$$

where $G_j^{j+k-1}$ is a block-generate signal for the adder 102-j.

Examples of conventional carry-skip adders are described in greater detail in U.S. Pat. No. 5,337,269 issued Aug. 9, 1994 in the name of inventors S. C. McMahan et al. and entitled "Carry Skip Adder with Independent Carry-In and Carry Skip Paths," and U.S. Pat. No. 5,581,497 issued Dec. 3, 1996 in the name of inventor S. Kumar and entitled "Carry Skip Adder with Enhanced Grouping Scheme," both of which are incorporated by reference herein.

It is generally desirable when designing a carry-skip adder to vary the block size k so as to optimize the carry propagation timing. In addition, it may also be possible to improve performance through the use of a multi-level skip.

Carry-skip adders are also often configured to include so-called split-adder logic. For example, many high speed communication and processing applications require an adder to perform full 32-bit additions as well as two parallel 16-bit additions. A conventional 32-bit carry-skip adder with split-adder logic uses a "split" control signal to configure the adder to perform either a 32-bit addition or two parallel 16-bit additions.

FIG. 2 illustrates the manner in which the above-described split function is implemented for an n-bit carry-skip adder with a three-stage carry skip, where each "stage" in this context corresponds to a particular bit of the n-bit carry-skip adder. More specifically, FIG. 2 shows a portion of the (n/2+1)th carry-skip stage of the n-bit carry-skip adder. In the figure, a logic circuit 200 associated with this (n/2+1)th carry-skip stage includes a series arrangement of first level skip elements 202-1, 202-2 and 202-3. A carry $C_{INj}$ is applied to an input of the first level skip element 202-1. The carry outputs of the skip elements 202-1, 202-2 and 202-3 are denoted $C^{OUT}_A$, $C^{OUT}_B$ and $C^{OUT}_C$, respectively. Propagate signal outputs of the skip elements 202-1, 202-2 and 202-3 are denoted $P_A$, $P_B$ and $P_C$, respectively, and are applied to inputs of a three-input AND gate 204.

The AND gate 204 generates a propagate signal p(j:n/2+1) which is applied as a control signal to a control input of a two-to-one multiplexer 206. If the propagate signal has a value of logic zero, the output $C^{OUT}_C$ of the skip element 202-3 is passed through to the output of multiplexer 206 as the carry signal C(n/2+1). If the propagate signal has a value of logic one, the carry $C_{INj}$ is passed through to the output of multiplexer 206 as the carry C(n/2+1).

The carry C(n/2+1) is then applied to one input of a two-to-one multiplexer 208 as shown. The other input of the multiplexer 208 receives input carry $C_1$. The output of the multiplexer 208 represents the input carry $C_{INj+1}$ to the next stage of the carry-skip adder. The above-noted "split" control signal is applied to the control input of the multiplexer 208. If the split control signal has a value of logic one, the carry-skip adder is operating as a 32-bit adder and the output carry is $C_1$. If the split control signal has a value of logic zero, the carry-skip adder is operating as two parallel 16-bit adders, and the output carry is C(n/2+1). The multiplexer 208 thus serves as an additional multiplexing stage between the low and high half of the carry-skip adder, and is operative to pass along the carry $C_1$ in a 32-bit addition or to zero the carry-in bit to the high word in the two parallel 16-bit addition case.

A significant problem with the above-described conventional arrangement for the incorporation of split-adder logic into a carry-skip adder is that the additional multiplexing stage results in an undesirable increase in the carry propagation delay. A need therefore exists for an improved approach which permits the incorporation of split-adder logic into a carry-skip adder without introducing additional propagation delay.

SUMMARY OF THE INVENTION

The present invention provides a carry-skip adder in which split-adder logic is incorporated without introducing additional propagation delay.

In accordance with the invention, an n-bit carry-skip adder includes a number of carry-skip stages and a logic circuit associated with one or more of the stages. The logic circuit includes split-adder logic and carry-skip logic configured such that a split control signal associated with the split-adder logic is applied to at least one gate of the carry-skip logic, so as to reduce a carry propagation delay of the adder. The gate of the carry-skip logic may be, for example, a gate which is also driven by a propagate signal of a carry-skip stage.

In an illustrative embodiment, the logic circuit is associated with an (n/2+1)th carry-skip stage of the adder, and the adder is configured to perform two parallel n/2-bit additions when the split control signal is at a first logic level, and to perform a single n-bit addition when the split control signal is at a second logic level.

The logic circuit in the illustrative embodiment may include a series arrangement of skip elements, a first one of the skip elements in the series receiving a first carry, and an output of a final one of the skip elements in the series representing a second carry. The propagate signal is generated as an output of a first logic gate, for example, a NAND gate, which receives as inputs the first carry and outputs of each of the skip elements.

The logic circuit in the illustrative embodiment also includes a multiplexer. More specifically, the first and second carries are applied to first and second signal inputs of a multiplexer having at least three signal inputs, and an input carry of the carry-skip stage is applied as a third carry to the third signal input. The multiplexer also has a plurality of control inputs for controlling selection of one of the first, second and third carries for propagation to an output of the multiplexer. A first one of the control inputs receives the split control signal, such that when the split control signal is at a first logic level, the third carry is propagated to the multiplexer output, and when the split control signal is at a second logic level, one of the first and second carries is propagated to the multiplexer output depending on a logic level of the propagate signal. Second and third control inputs receive outputs of second and third logic gates, respectively, each of these logic gates receiving one of a complemented or an uncomplemented version of the split control signal. As a result, when the split control signal is at the second logic level, the first carry is propagated to the output of the multiplexer if an output of the second logic gate is at the first logic level, and the second carry is propagated to the output of the multiplexer if an output of the second logic gate is at the first logic level.

Advantageously, the present invention provides a reduced computational delay relative to conventional carry-skip architectures such as that described above. Moreover, the improved performance is provided without any significant increase in the required circuit area. The techniques of the invention are applicable to a wide variety of adders, including both radix-2 adders and non-radix-2 adders. These and other features and advantages of the present invention will become more apparent from the accompanying drawings and the following detailed description.

DETAILED DESCRIPTION OF THE INVENTION

The present invention is illustrated herein in conjunction with exemplary adders and associated logic circuitry. It should be understood, however, that the invention is not limited to use with any particular type of adder or logic circuit implementation, but is instead more generally applicable to any carry-skip adder in which it is desirable to provide a significant reduction in critical path delay without unduly increasing the cost or complexity of the adder circuit. For example, although the invention is illustrated using radix-2 carry-skip adders, it will be apparent to those skilled in the art that the disclosed techniques are readily applicable to other types of adders, including non-radix-2 adders.

The present invention provides a carry-skip adder which incorporates split-adder logic and exhibits improved performance relative to the conventional adders previously described. By simplifying the split control function of the split-adder logic incorporated into the (n/2+1)th stage of an n-bit carry-skip adder, the invention reduces the number of multiplexing stages in the slowest carry propagation path, thereby improving the overall speed of the adder.

As noted previously, one example of a carry-skip adder with split-adder logic is an n-bit split-carry adder capable of performing full n-bit additions as well as two parallel n/2-bit additions, in accordance with the state of a split control signal. The illustrative embodiment of the invention will initially be described as implemented in a carry-skip adder of this type.

Figure 3:
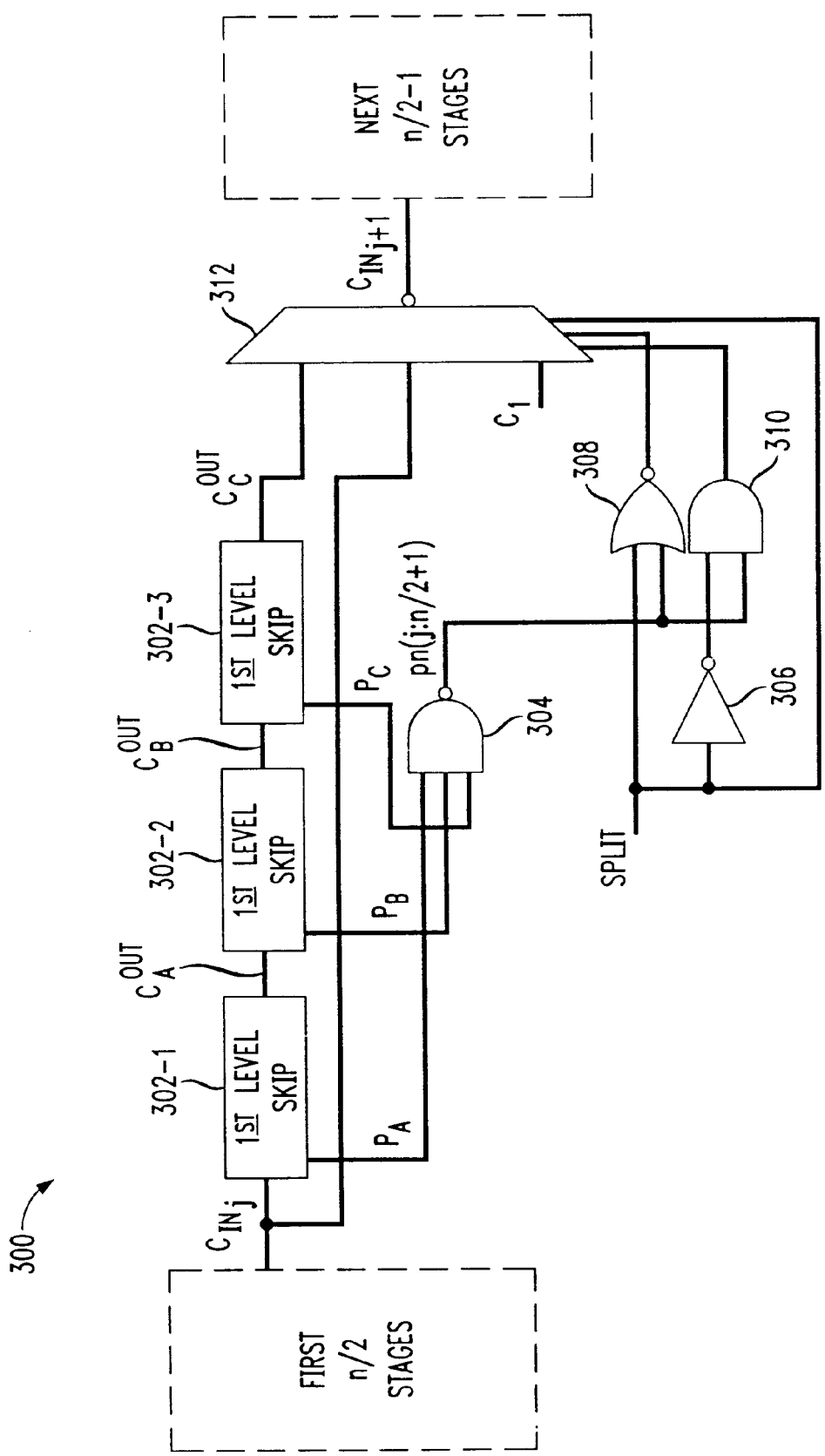
FIG. 3 is a schematic diagram of an exemplary set of logic circuitry including carry-skip logic and split-adder logic for use in an (n/2+1)th stage of an n-bit carry-skip adder in accordance with an illustrative embodiment of the invention.

FIG. 3 illustrates the manner in which the above-described split function is implemented in an n-bit carry-skip adder in accordance with the invention. The figure shows a logic circuit 300 associated with the (n/2+1)th carry-skip stage of the n-bit carry-skip adder in accordance with the invention. The logic circuit 300 includes carry-skip logic and split-adder logic. More specifically, the circuit 300 includes a series arrangement of first level skip elements 302-1, 302-2 and 302-3, a three-input NAND gate 304, an inverter 306, a two-input NOR gate 308, a two-input NAND gate 310 and a three-to-one inverting multiplexer 312.

A carry $C_{INj}$ is applied to an input of the first level skip element 302-1 and to a second input of the multiplexer 312. The carry outputs of the skip elements 302-1, 302-2 and 302-3 are denoted $C^{OUT}_A$, $C^{OUT}_B$ and $C^{OUT}_C$, respectively. Propagate signal outputs of the skip elements 302-1, 302-2 and 302-3 are denoted $P_A$, $P_B$ and $P_C$, respectively, and are applied to inputs of the three-input NAND gate 304. The carry output $C^{OUT}_C$ of the third skip element 302-3 is applied to a first input of the multiplexer 312. The third input of the multiplexer 312 is an input carry $C_1$. The NAND gate 304 generates a complemented propagate signal pn(j:n/2+1) which is applied to one input of each of the NOR gate 308 and the AND gate 310. A split control signal is applied to the other inputs of each of the NOR gate 308 and the AND gate 310, and to one of three control inputs of the multiplexer 312.

If the split control signal has a value of logic one, the carry-skip adder is operating as an n-bit adder and the output carry is $C_1$. If the split control signal has a value of logic zero and the complemented propagate signal pn(j:n/2+1) has a value of logic one, the output of the NAND gate 310 has a value of logic one, and the output $C^{OUT}_C$ of the skip element 302-3 is passed through to the output of multiplexer 312. If the split control signal has a value of logic zero and the complemented propagate signal has a value of logic zero, the output of the NOR gate 308 has a value of logic one, and the carry $C_{INj}$ is passed through to the output of multiplexer 312. The output of the multiplexer 312 represents the input carry $C_{INj+1}$ to the next stage of the carry-skip adder. Thus, if the split control signal has a value of logic zero, the carry-skip adder is operating as two parallel n/2-bit adders.

Advantageously, the logic circuit 300 of FIG. 3 eliminates the additional multiplexing stage typically associated with the incorporation of split-adder logic in conventional carry-skip adders, and thereby allows the introduction of split-adder logic without increasing propagation delay. More particularly, since the split control signal is available in the beginning of the addition operation, this embodiment removes it from the critical carry propagation path and allows the carry-skip adder to be optimally frequency-limited by the carry-skip propagation, thus improving the overall speed of the adder.

TABLE 1 below shows the parameters of an example of a very large scale integration (VLSI) circuit implementation of a carry-skip adder in accordance with the present invention.

TABLE 1

Figure 1:
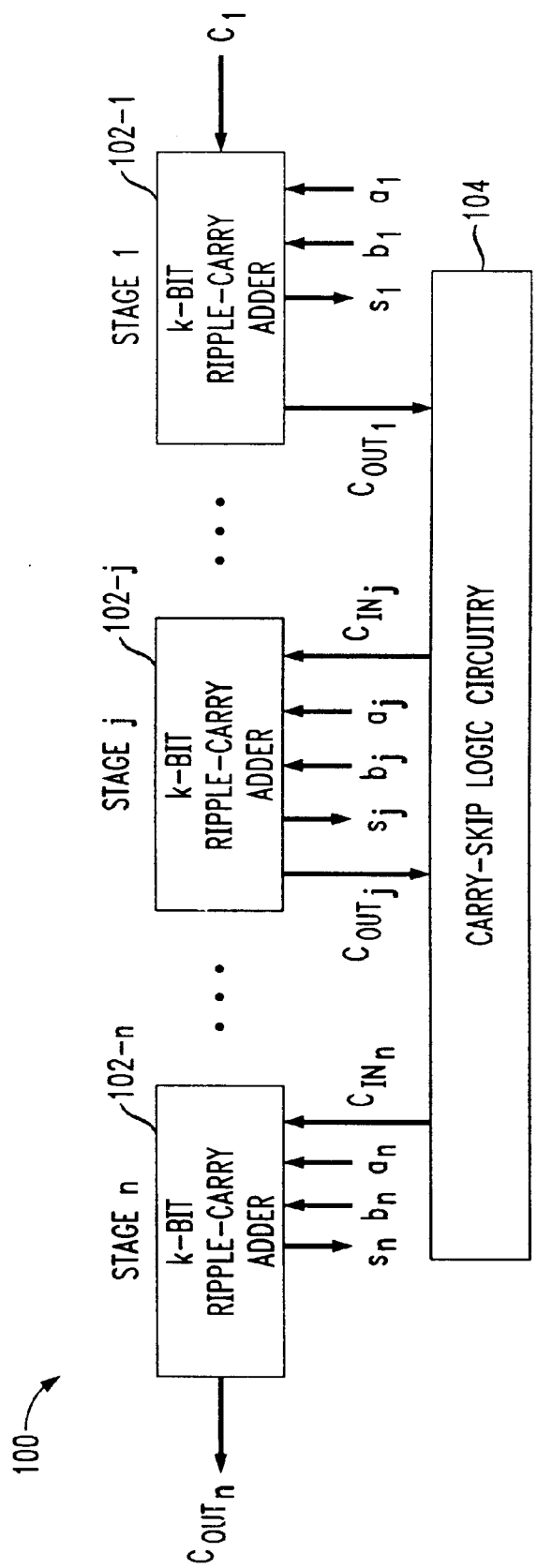
FIG. 1 is a block diagram of a conventional n-bit carry-skip adder.
Figure 2:
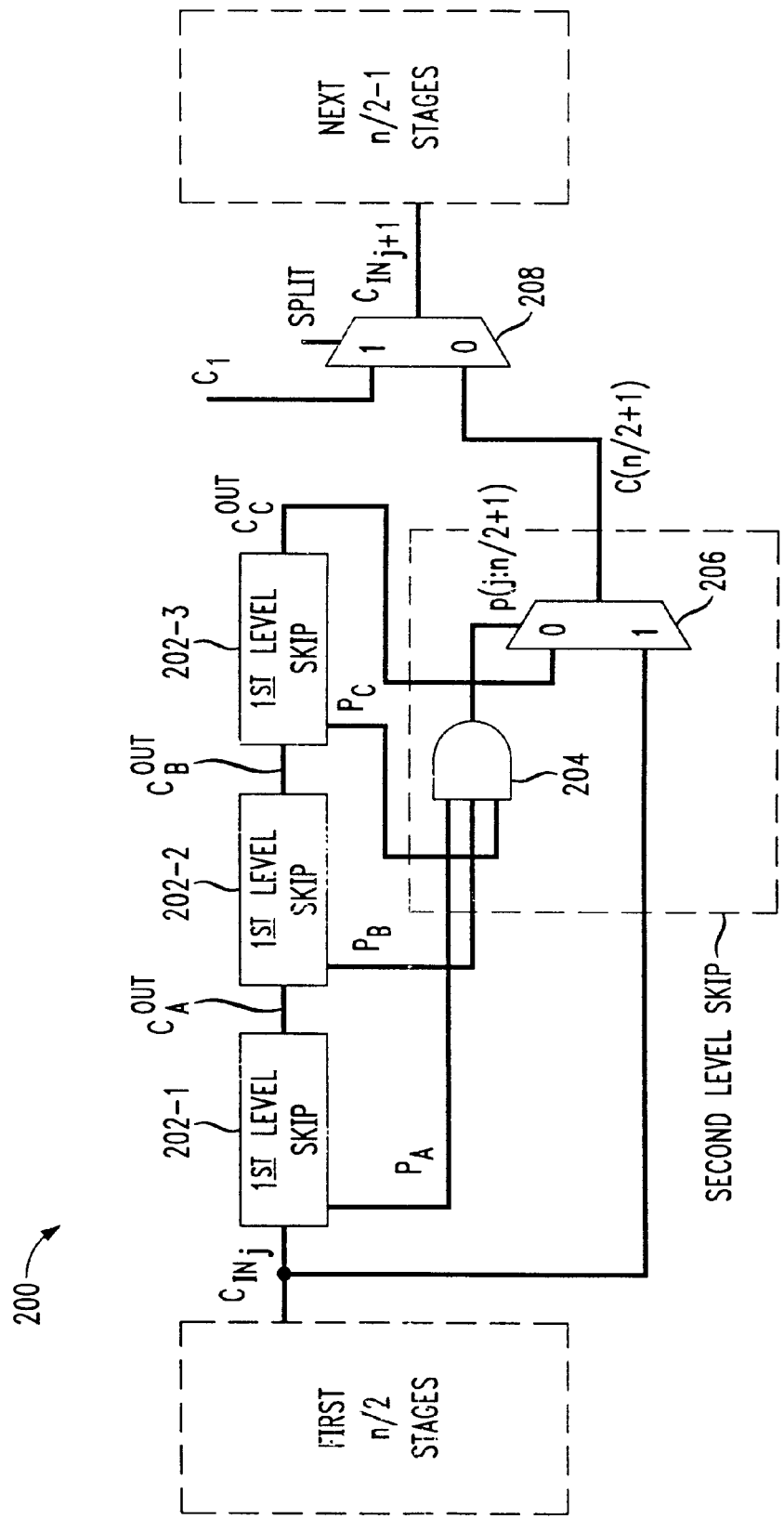
FIG. 2 is a schematic diagram of a conventional set of logic circuitry including carry-skip logic and split-adder logic for use in an (n/2+1)th stage of the n-bit carry-skip adder of FIG. 1.

| Adder Type | Gate Count | Logic Depth | Path Delay (ns) | Area |
|---|---|---|---|---|
| Carry-Skip Adder with FIG. 2 Logic Circuit | 576 | 69 stages | 4.7 ns | 80 × 750 μm |
| Carry-Skip Adder with FIG. 3 Logic Circuit | 582 | 68 stages | 4.4 ns | 80 × 750 μm |

The implementations summarized in the above table are based on a Lucent Technologies 0.25 μm complementary metal-oxide-semiconductor (CMOS) process at nominal 2.3 V, 100° C. conditions. In this example, the FIG. 3 circuit 300 uses six additional gates relative to the FIG. 2 circuit. These additional gates were fit in between carry-skip logic blocks so as to avoid the need for any additional circuit area. It can be seen from TABLE 1 that the use of the FIG. 3 logic circuit improves the critical carry propagation path through the adder with a minimum number of additional gates and no area cost.

The logic circuit 300 of FIG. 3 may be incorporated in a wide variety of different types of carry-skip adders. For example, although illustrated with a three-stage carry-skip implementation, the invention is applicable to a carry-skip adder implementation with any desired number of stages of carry skip. In the specific illustrative implementation of FIG. 3, such additional carry skips can be incorporated by including additional skip elements 302 and corresponding additional inputs for the NAND gate 304. Those skilled in the art will recognize that numerous alternative implementations are also possible.

Figure 4:
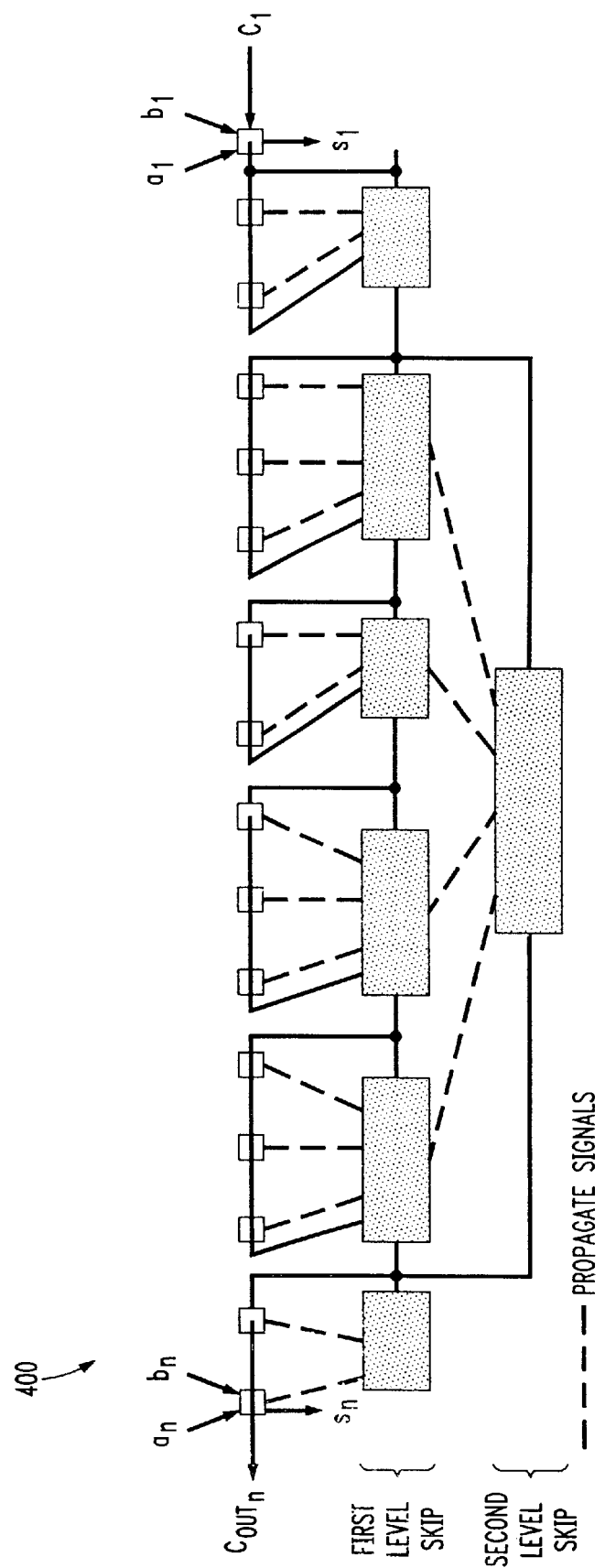
FIG. 4 shows an example of a carry-skip adder in which the present invention may be implemented.

FIG. 4 shows one possible example of a 16-bit carry-skip adder 400 in which the present invention may be implemented. The adder 400 uses multi-level skip and variable block size techniques. In the figure, empty squares represent full adders, filled rectangles implement either first level or second level skip equations, dashed lines are propagate signals, and solid lines are carry paths.

It should be emphasized that the logic circuitry described herein is shown by way of example only. In general, the invention combines split-adder logic with carry-skip logic such that the need for an additional multiplexing stage is eliminated. Those skilled in the art will recognize that numerous alternative arrangements of logic circuitry may be used to incorporate split-adder logic without the addition of propagation delay in accordance with the techniques of the invention. In addition, it should be noted that the term "split control signal" as used herein is intended to include not only a control signal including a single logic signal component as in the illustrative embodiment of FIG. 3, but also control signals having multiple logic signal components. In other words, a split control signal in accordance with the invention may be comprised of multiple separate and distinct signals. By way of example, a split control signal made up of two or more separate and distinct signals could be used to control split-adder logic configured in accordance with the invention.

The above-described illustrative embodiments of the invention may be configured to meet the requirements of a variety of different circuit applications, using any desired value of n. Adders in accordance with the invention may be used as elements of many different types of circuits, such as, for example, arithmetic logic units (ALUs), multiply-add units, and comparators. The invention can be incorporated in a wide variety of integrated circuits or other processing devices, including, for example, microprocessors, digital signal processors (DSPs), microcontrollers, application-specific integrated circuits (ASICs), memory circuits, telecommunications hardware and other types of processing devices. In addition, the invention can be implemented using either static circuits, dynamic circuits or combinations of both static and dynamic circuits. Moreover, as previously noted, a variety of other types of adders, including non-radix-2 adders, may also be implemented using the techniques of the present invention. These and numerous other alternative embodiments within the scope of the following claims will be apparent to those skilled in the art.

What is claimed is:

1. An adder comprising:
   a plurality of carry-skip stages; and
   a logic circuit associated with at least one of the carry-skip stages, the logic circuit comprising split-adder logic and carry-skip logic, the logic circuit being configured such that a split control signal associated with the split-adder logic is applied to at least one gate of the carry-skip logic, so as to reduce a carry propagation delay of the adder.

2. The adder of claim 1 wherein the gate of the carry-skip logic is also driven by a propagate signal of the at least one carry-skip stage.

3. The adder of claim 2 wherein the carry-skip logic of the logic circuit further comprises a series arrangement of a plurality of skip elements, a first one of the skip elements in the series receiving a first carry, and an output of a final one of the skip elements in the series representing a second carry.

4. The adder of claim 3 wherein the propagate signal is generated as an output of a first logic gate which receives as inputs propagate signal outputs of the plurality of skip elements.

5. The adder of claim 4 wherein the first logic gate comprises a NAND gate.

6. The adder of claim 3 wherein the first and second carries are applied to first and second signal inputs of a multiplexer of the logic circuit, the multiplexer having at least three signal inputs, and wherein an input carry of the at least one carry-skip stage is applied as a third carry to the third sign input.

7. The adder of claim 6 wherein the multiplexer has a plurality of control inputs for controlling selection of one of the first, second and third carries for propagation to an output of the multiplexer.

8. The adder of claim 7 wherein a first one of the control inputs receives the split control signal, such that when the split control signal is at a first logic level, the third carry is propagated to the multiplexer output, and when the split control signal is at a second logic level, one of the first and second carries is propagated to the multiplexer output depending on a logic level of the propagate signal.

9. The adder of claim 8 wherein second and third ones of the control inputs receive outputs of second and third logic gates, respectively, of the logic circuit, each of the logic gates receiving one of a complemented or an uncomplemented version of the split control signal, such that when the split control signal is at the second logic level, the first carry is propagated to the output of the multiplexer if an output of the second logic gate is at the first logic level, and the second carry is propagated to the output of the multiplexer if an output of the second logic gate is at the first logic level.

10. The adder of claim 9 wherein the second logic gate comprises a NOR gate.

11. The adder of claim 9 wherein the third logic gate comprises an AND gate.

12. The adder of claim 1 wherein the adder comprises a radix-2 adder.

13. The adder of claim 1 wherein the adder comprises an n-bit adder and the logic circuit is associated with an (n/2+1)th carry-skip stage of the adder.

14. The adder of claim 13 wherein the adder is configured to perform two parallel n/2-bit additions when the split control signal is at a first logic level, and is configured to perform a single n-bit addition when the split control signal is at a second logic level.

15. An integrated circuit comprising:

at least one adder circuit, the adder circuit comprising a plurality of carry-skip stages and a logic circuit associated with at least one of the carry-skip stages, the logic circuit comprising split-adder logic and carry-skip logic, the logic circuit being configured such that a split control signal associated with the split-adder logic is applied to at least one gate of the carry-skip logic, so as to reduce a carry propagation delay of the adder.

16. A method for performing an addition operation, the method comprising the step of:

applying a pair of numbers to be added to an adder comprising a plurality of carry-skip stages and a logic circuit associated with at least one of the carry-skip stages, the logic circuit comprising split-adder logic and carry skip-logic, the logic circuit being configured such that a split control signal associated with the split-adder logic is applied to at least one gate of the carry-skip logic, so as to reduce a carry propagation delay of the adder, the adder generating a sum of the two numbers.

* * * * *